United States Patent [19]

Miyoshi et al.

[11] 4,077,454
[45] Mar. 7, 1978

[54] PNEUMATIC TIRES SUITABLE FOR OFF-ROAD VEHICLES

[75] Inventors: Isao Miyoshi, Kodaira; Masaru Abe, Sayama; Toshiro Tezuka, Higashi-Murayama; Toshio Yoshimoto, Akigawa, all of Japan

[73] Assignee: Bridgestone Tire Company Limited, Tokyo, Japan

[21] Appl. No.: 645,141

[22] Filed: Dec. 29, 1975

[30] Foreign Application Priority Data

Dec. 28, 1974 Japan .................................. 50-3822

[51] Int. Cl.² .......................... B60C 9/10; B60C 9/20
[52] U.S. Cl. ............................ 152/354 R; 152/361 R
[58] Field of Search ............... 152/354, 356, 357, 359, 152/361 R, 361 DM, 361 FP, 209 B

[56] References Cited

U.S. PATENT DOCUMENTS

| | | | |
|---|---|---|---|
| 2,752,980 | 7/1956 | Riggs | 152/354 |
| 2,930,426 | 3/1960 | Klang et al. | 152/354 |
| 3,392,774 | 7/1968 | Le Bosse | 152/361 R |
| 3,513,898 | 5/1970 | Lugli et al. | 152/361 R |
| 3,589,424 | 6/1971 | Sasaki | 152/354 |
| 3,599,696 | 8/1971 | Hartz | 152/361 DM |
| 3,861,440 | 1/1975 | Ochiai | 152/354 |

*Primary Examiner*—Drayton E. Hoffman
*Attorney, Agent, or Firm*—Sughrue, Rothwell, Mion, Zinn and Macpeak

[57] ABSTRACT

A pneumatic tire for off-road vehicles comprising a multi-layered carcass and a breaker superimposed about the carcass. The carcass is composed of rubberized ply layers each containing cords formed of organic fiber and inclined at an angle of 23° to 45° with respect to the equatorial line of the tire. The cords of approximately one-half of the carcass plies extend in an opposite direction to the cords associated with the remaining plies. The breaker is composed of at least one rubberized layer each containing reinforcing elements formed of a plurality of filaments whose material having a tensile strength of at least 140 Kg/mm², the reinforcing element being inclined at an angle which is not larger than a selected angle of the carcass cord by at least 5° and not smaller than the selected angle of the carcass cord by at least 15°. At least one rubberized layer of the breaker disposed near the tread is extended over a width of 40 to 60% of the tread width.

4 Claims, 12 Drawing Figures

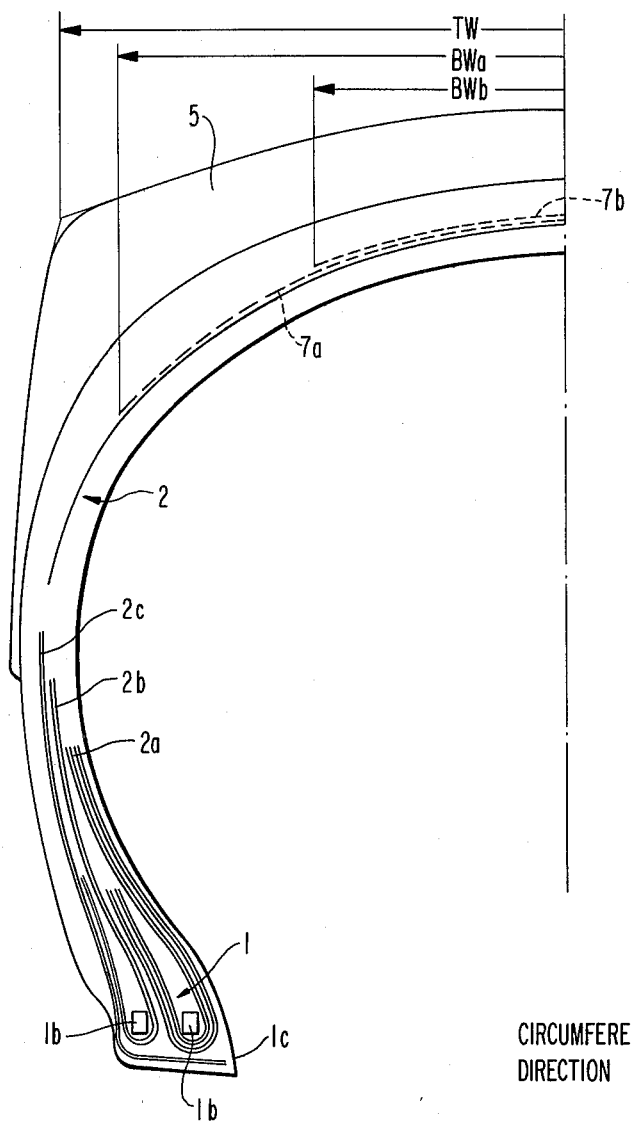
FIG IA
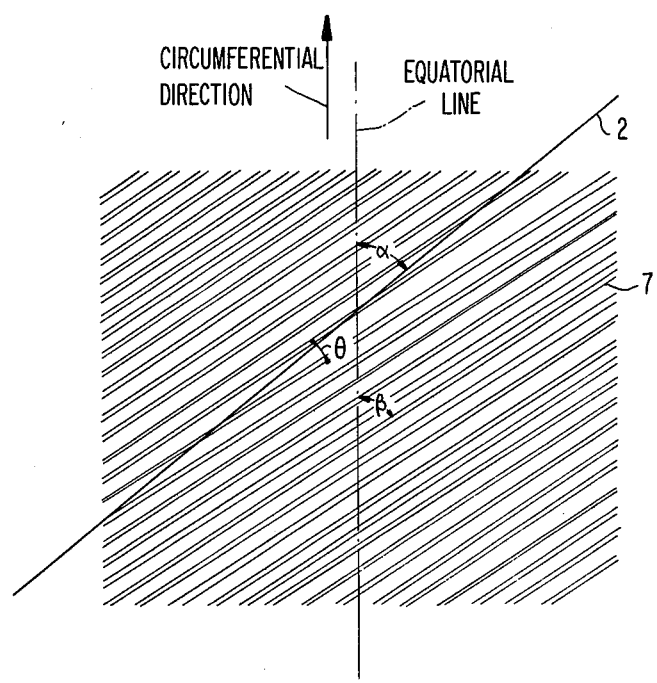
FIG IB

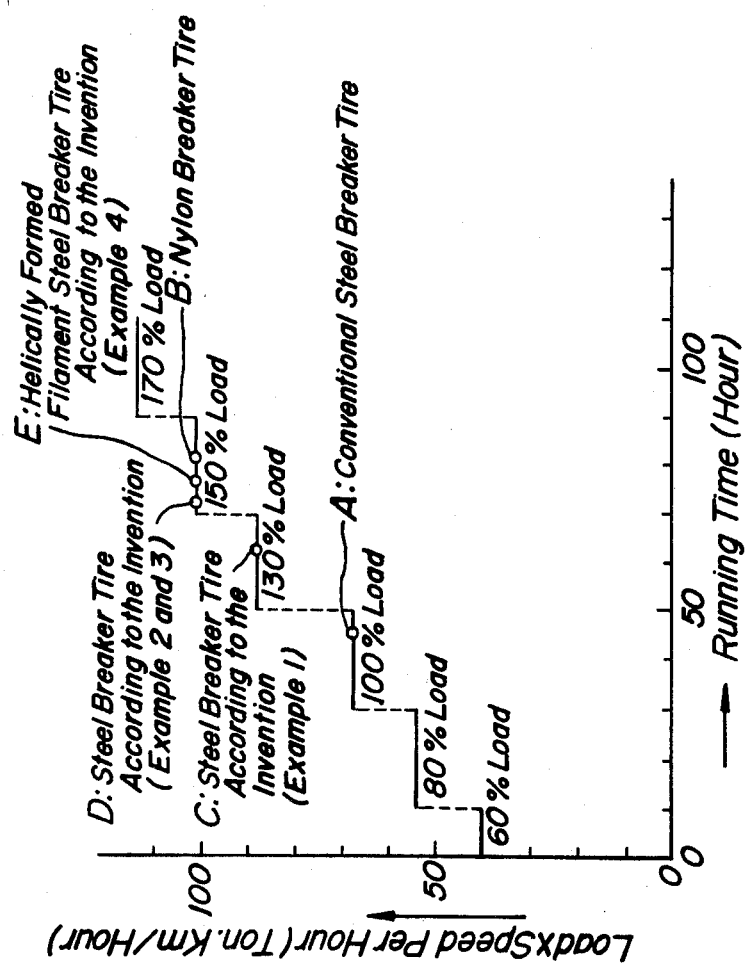

PNEUMATIC TIRES SUITABLE FOR OFF-ROAD VEHICLES

This invention relates to improvements in pneumatic tires suitable for off-road vehicles. Pneumatic tires suitable for off-road vehicles and adapted for use in construction or cultivation vehicles such as a dump truck, scraper, loader, bulldozer and the like or in special yard vehicles are subjected to heavy weight of the vehicle wheels when the tires run on off-road conditions where obstructions such as sharp rocks, broken stones, stubs, pieces of broken metal and the like are scattered thereon thereby providing extremely severe service conditions. As a result, the tire is liable to be damaged on its surface portion due to cuts subjected thereto and to be damaged in its interior portion due to overload locally subjected thereto when the tire makes contact with ground in an unstable manner.

This invention improves the durability of the pneumatic tire for rough ground use such that less damage to both the surface and interior portions of the tire occurs even under extremely severe service conditions, thereby resulting in an increased life of the tire.

The invention is not only applicable to pneumatic tires which are used in the above mentioned heavy-duty applications, but also applicable to large and intermediate type vehicle tires whch are eventually required to run on off-road conditions.

Experimental tests on the carcass and breaker structures constituting a main reinforcing body of the above mentioned kind of tire under the above described severe service conditions concluded that the above mentioned improvement can be effected by suitably adopting the following three measures, i.e.

1. dispersion and mitigation of stress subjected to the various parts of the tire and particularly to the side portion thereof, 2. improvement in the resistance to damage due to cuts (hereinafter will be described as cut resistant property) of the crown portion of the tire with the aid of the breaker characteristic, and 3. improvement in the resistance to separation of rubber around a reinforcing layer in a crown portion of the tire (hereinafter will be described as separation resistant property) with the aid of the breaker arrangement.

It has been the common practice to provide pneumatic tires with a radial carcass, semi-radial carcass and bias carcass. In pneumatic tires for off-road vehicles, heretofore it has been the common practice to use the radial carcass containing steel cords or to use the bias carcass containing nylon cords. The advantages and disadvantages of the radial carcass are not balanced with those of the bias carcass, so that the advantages and disadvantages of these two carcasses are substantially about equal.

That is, a radial carcass tire has a great flexibility at its side portions, so that that portion of the side portions which makes contact with ground becomes deformed to protrude when subjected to the eccentric load. As a result, there is a propensity for the side portion thus protruded to collide with the obstructions such as stones. Hence, the radial carcass tire is disadvantageous since it is liable to be subjected to side cuts.

On the contrary, a bias carcass tire can effectively suppress the deformation at its side portions. Particularly, the bias carcass tire makes exclusive use of organic fiber cords, whose rigidity is not materially different from the rigidity of the rubber. As a result, the stress subjected to the side portion of the bias carcass tire can effectively be dispersed and mitigated. But, the bias carcass tire has disadvantages that use must be made of a multi-layered carcass composed of a considerable number of plies to endure the heavy wheel load subjected thereto and hence the reinforcing ply becomes complex in construction.

The use of suitable number of plies selected for the multi-layered carcass of the bias carcass tire in correspondence with the load subjected to the tire ensures an increase of the rigidity of the tire and hence a suppression of the deformation of the tire, thereby further improving the cut resistant property of the side portion of the tire.

In addition, the bias tire has an enveloping power (a power of a tire whose crown portion can envelope small obstructions when the tire rides thereon) which is greater than that of the radial tire. That is, the greater enveloping force causes the tread to surround sharp rocks when the tire rides on them and effectively mitigates the stress applied from the sharp edge of the rocks, thereby preventing the crown portion of the tire from being damaged due to cuts.

The radial tire is composed of a carcass member formed by plies including cords lying in radial planes and combined with a belt including cords inclined at a small angle with respect to the equatorial line of the tread. Such belt has a so-called hoop effect which can withstand the circumferential stress subjected to the tire. As a result, the above mentioned enveloping power which can prevent the crown portion of the tire from being damaged by cuts becomes relatively small because of the presence of the tension directly acting on the cords of both the carcass member and the belt.

This invention is based on the recognition that the bias tire is far superior to the radial tire with respect to the cut resistant property of the side portion and the enveloping property of the tread.

In order to prevent that part of the crown portion of the tire which makes contact with ground, that is, the tread from being damaged by cuts, it has heretofore been proposed to use a steel cord breaker instead of a nylon cord breaker whereby the cut resistant property of the crown portion of the tire can be enhanced by a factor of about two. The arrangement of the cords in the belt of the radial tire is not only small in the enveloping power as described above, but also is liable to be damaged by separation between the breaker layer and the tread rubber on the one hand and between the breaker layers on the other hand. As a result, there is an acute problem that the tires resistance to damage decreases and hence is useless in the middle of the service life of the tire.

Experimental tests have produced the result that even though the use of the steel cord breaker can improve the cut resistant property of the crown portion of the tire in general, such improvement in the cut resistant property is not frequently obtained, that the damage due to separations occurs at a relatively early time in use, and that in many cases overall improvement in the durability of the tire could not be obtained.

This problem has heretofore been considered as the fatal disadvantage inherent in the steel cord breaker.

That is, the modulus of elasticity of the steel cord breaker is considerably higher than that of the tread rubber. This considerably large difference between the modulus of elasticity of the steel cord breaker and that of the tread rubber results in occurrence of the damage due to separation.

Experimental tests on the difference between the modulus of elasticity of the cord material usable for the breaker and that of the tread rubber have produced the following results. Assume the modulus of elasticity of the tread rubber be 300%, the modulus of elasticity of the steel cord is $3 \times 10^4$ to $6 \times 10^4$ times higher than that of the tread rubber, the modulus of elasticity of the organic fiber cord formed of aromatic polyamide having a high modulus of elasticity is $1.3 \times 10^4$ to $2.5 \times 10^4$ times higher than that of the tread rubber, the modulus of elasticity of the glass fiber cord is $0.9 \times 10^4$ to $1.6 \times 10^4$ times higher than that of the tread rubber, the modulus of elasticity of the rayon cord is $0.4 \times 10^4$ to $0.7 \times 10^4$ times higher than that of the tread rubber, the modulus of elasticity of the nylon 66 cord is $0.15 \times 10^4$ to $0.25 \times 10^4$ times higher than that of the tread rubber, and the modulus of elasticity of the nylon 6 cord is $0.12 \times 10^4$ to $0.2 \times 10^4$ times higher than that of the tread rubber. Experimental tests have also indicated that if the modulus of elasticity of the cord material usable for the breaker is $1 \times 10^4$ times higher than that of the tread rubber, the separation resistant property of the breaker becomes degraded.

In addition, experimental tests on the distribution of the stress and strain subjected to the crown portion of the bias tire have indicated that the maximum stress and strain are produced at the hump portion of the tire in the area which is in contact with ground, that is, at the maximum thickness portion from the carcass to the tire surface measured in the normal line to the carcass. The conventional steel breaker is arranged in the crown portion and extends to the hump portion. This arrangement of the steel cord breaker also causes damage due to separation.

Precise analytical tests on tires provided with the steel cord breaker and have been used in practice have yielded data indicating that the number of occurrences of the damage due to cuts of the tread portion is peak at the center area of the tread portion and concentrically distributed over a range of 40 to 60% of the tread width, and that the number of occurrences of the damage due to cuts produced in the distribution area is more than 85% of the total number of occurrences of the damage due to cuts in the total tire surface.

This invention is directed at improvement of the separation resistant property of the tire by taking the above recognition into consideration.

A so-called wire under tread tire (WUT tire) has also been proposed. The WUT tire comprises a rubberized layer containing thin metallic wire filaments each having a length on the order of 10 mm and arranged between the tread rubber and the carcass so as to prevent growth of the damage due to cuts started from the tire tread into the interior portion of the tire. The WUT tire has been the subject of marketing. In practice, however, interior layer separation starting from the wire layer is frequently bound, so that the life of the WUT tire becomes exhausted due to the separation damage before the tire will attain its advantageous feature due to its large cut resistant property. As a result, the improvement in the overall durability of the WUT tire could not be attained.

An object of the invention, therefore, is to provide a pneumatic tire for off-road vehicles, which has both improved cut resistant property and improved separation resistant property.

Another object of the invention is to provide a pneumatic tire for off-road vehicles, which can improve both the cut resistant property and the separation resistant property with the least possible materials required for building the tire.

A further object of the invention is to provide a pneumatic tire for off-road vehicles and having a high durability, which can obviate the above mentioned disadvantages of the WUT tire, has a separation resistant property which is the same as that of the nylon cord breaker and a cut resistant property which is far superior to those of the WUT tire which is provided beneath its tread with a wire layer and of the nylon cord breaker tire, and which can significantly reduce the rate of occurrences of damage due to cuts.

A feature of the invention is the provision of a pneumatic tire for off-road vehicles, comprising a multi-layered carcass composed of rubberized laminated ply layers, the cords of which are formed of organic fiber and inclined at an angle of 23° to 45° with respect to the equatorial line of the tire, the cords of approximately one-half of said plies extending in an opposite direction to the cords associated with the remaining plies.

The above mentioned arrangement of cords and ply layers of the carcass plies are useful for preventing the side cuts and can be associated with a reinforcing element angle of the breaker which will be described so as to improve the enveloping property in the tread. Such improvement in the enveloping property in the tread in conjunction with selection of material of the breaker reinforcing element significantly contributes to an increase in the cut resistant property of the tire.

If the cord angle of the carcass ply is smaller than 23°, it is difficult to deform the carcass into a toroidal form in the tire building step. On the contrary, if the cord angle of the carcass ply is larger than 45°, an undesirable flexibility is given to the side portions of the tire. This greater flexibility of the side portions of the tire could not sufficiently prevent the side cuts even when the side portions are associated with the breaker in such a manner as will be described herein.

In accordance with the invention, the breaker arranged between the multi-layered carcass and the tread rubber in the crown portion of the tire and superimposed about the muti-layered carcass is composed of at least one rubberized layer each containing reinforcing elements. The reinforcing element is composed of a filament or a bundle of filaments or a cord of stranded filaments. The tensile strength of the material of the filament is made at least 140 Kg/mm², preferably at least 170 Kg/mm² and at least 200 Kg/mm² when a maximum cut resistant property of the filament is required.

The above mentioned tensile strength of the breaker is defined by a balanced resistance to cuts penetrating into the tire which resistance is present in the tire immediately before the tread cut or side cut is produced by sharp rocks and the like when the tire rides on or is urged against these rocks. If the tire is used under conditions where a comparatively small tread cut is produced, use may be made of a filament whose material having a tensile strength of at least 140 Kg/mm². If the tire is used under conditions where a severe tread cut is produced, it is required to use a filament whose material having a tensile strength of 200 Kg/mm².

The breaker reinforcing element angle must not be larger than a selected carcass cord angle by at least 5° and must not be smaller than the selected carcass cord angle by at least 15°. If the breaker reinforcing element angle is defined within the above mentioned range, the cut resistant property of the tire can be improved so as to contribute to the above mentioned enveloping property.

As above mentioned, in order to improve the cut resistant property of the tire, the breaker reinforcing element is formed of a material having a high cut resistant property, so that the breaker reinforcing element is destined to have a high modulus of elasticity. As a result, the breaker reinforcing element has the above mentioned disadvantage with respect to the separation resistant property.

In accordance with the invention, the breaker is composed of at least one rubberized layer and the width of at least one layer adjacent to the tread is made 40% to 60%, preferably 45% to 55% of the tread width, the width of the remaining layers being made equal to or narrower than the tread width. Alternatively, use may be made of rubberized layers superimposed one upon the other for a narrower width or of one rubberized layer having a narrow width.

The reasons why the width of the rubberized breaker layer is defined as above will now be described. In accordance with the invention, separation is prevented from occurring without degrading the cut resistant property on the basis of the recognition that occurrence of the crown cuts is distributed over 40 to 60% of the tread width about the crown center, and that the separation is produced by the arrangement of the breaker layers over the hump portion. That is, the upper limit is defined by the separation resistant property of the breaker and the lower limit is defined so as to obtain the required tread cut resistant property. The tread width TW and the breaker width BW are not measured along arcuate peripheries of the tread and the breaker layer, respectively, but are measured along a straight line as shown in FIG. 1.

The use of the measures described ensures a large difference between the modulus of elasticity of the breaker reinforcing element and that of the tread rubber and provides the disadvantage that the rotation of the tire on off-road under heavy loadings subjected thereto from the wheel results in a significantly eccentric strain in the crown portion and in minute damage starting from the damage of tread rubber near the reinforcing element or from the deterioration of adherence of rubber and growing into the separation. Such a disadvantage could not be eliminated even though the tensile strength of the breaker is enhanced because the tensile strength must exceed the above defined upper limit in dependence with the service condition.

Under the above circumstances, in accordance with the invention, the force for adhering the reinforcing elements to the rubber and the tensile strength of the rubber near the cords are limited to values on the order which are not adverse to the commercial production base through the higher these values the better the protection of the tire. In addition, the above mentioned minute damage is eliminated to a least possible extent and the growth of the damage to the separation is effectively prevented so as to enhance the separation resistant property.

That is, in accordance with the invention, a ratio $\delta$ of a space formed between the surfaces of two adjacent cores $S-d$ to a pitch $S$ between the midlines of the two adjacent cords is given by $\delta = (S-d)/S = 0.67$ to 0.83, whe $d$ is a cord diameter. That is, the cords in the breaker are made relatively small in number.

Alternatively, the breaker according to the invention may suitably be divided in its widthwise direction.

In addition, the outside or the tread side of the breaker layer may be covered with at least one rubberized cord layer formed of organic fiber and having a width which is wider than that of the breaker layer. The covered layer may be formed into pairs which cover both side edges of the rubberized breaker cord layers. The use of this measure can distribute the sudden change of the modulus of elasticity of the breaker with respect to the rubber in a stepwise manner, thereby obviating the sudden change of the modulus of elasticity and improving a recap property of the tire.

The reasons why the space formed between the two adjacent reinforcing elements of the breaker is defined by the above ratio $\delta = S - d/S$ will now be explained. In practice, on the supposition that the stones and the like are bitten into the cuts inevitably produced in the tread, it is necessary to prevent the tread from being penetrated by the stone. As a result, the ratio $\delta$ could not be made larger than 0.83. Experimental tests have been performed on the limit of interrupting the transmission of the shearing stress produced in the rubber surrounding the cords of the breaker in dependence with the deformation of the tire during its rotation on ground. These tests indicate that the ratio $\delta$ is required not smaller than 0.67.

In accordance with the invention, use may preferably be made of a helically formed filament such as a curled filament and the like, more preferably helically formed steel filament as the material having an excellent cut resistant property of the breaker reinforcing element.

The reinforcing element is composed of a bundle of 2 to 50 helically formed filaments each having a diameter ($\phi$) of 1.0 mm to 0.1 mm. A ratio of the maximum diameter Dmax to the mimimum diameter Dmin projected on a plane perpendicular to the axial direction of one pitch of the helically formed filament is equal to or smaller than 1.5, i.e. Dmax/Dmin $\leq$ 1.5, and an average diameter (D) of (Dmax+Dmin)/2=(2 to 20)$\phi$ ($\phi$ is a filament diameter in mm).

The use of such helically formed filament bundle according to the invention makes it possible to improve the overall durability of the tires suitable for off-road vehicles.

That is, 2 to 50, preferably 3 to 30 relatively thin helically formed filaments each having a diameter ($\phi$) of 0.1 mm to 1.0 mm, preferably 0.13 mm to 0.5 mm and formed of a material having a tensile strength of the above mentioned range are bound into a bundle without twisting together and without surrounded by an outer bind wire.

If the above mentioned ratio of the maximum diameter Dmax to the minimum diameter Dmin of the helically formed filament lies within a range which will hereinafter be described, the stress subjected to it becomes substantially uniformly distributed in practice, and as a result, a premature damage due to fatigue is not induced. That is, the ratio of Dmax to Dmin may preferably be 1 to 1.5.

Experimental tests have indicated that the average diameter D of the helically formed filament may be related to the filament diameter $\phi$ such that the average diameter D should be 2$\phi$ to 20$\phi$, preferably 3$\phi$ to 15$\phi$.

The helically formed filament provides a necessary elongation to the filament. In this case, the stress occurred in dependence with elongation or contraction in the lengthwise direction is substantially uniformly distributed in all of portions of the filament in its lengthwise direction. In addition, this stress is a torsional shearing stress which can easily be distributed in the sectional plane of the filament in a relatively uniform manner, so that it is possible to completely prevent the damage due to fatigue.

In order to make the interior stress in the filament uniform, it is preferable to make the filament as thin as possible. If use is made of a filament whose diameter is smaller than 0.1 mm, the filament is frequently breaker in allowable extent in the same manner as in the case that the filament is formed into the helically formed filament. As a result, it is clear that the use of such thin filament is not economical. On the contrary, if use is made of a filament whose diameter ($\phi$) is larger than 1.0 mm, the internal stress produced in the step of forming the helically formed filament becomes excessive. In addition, the torsional shearing stress produced when the force for expanding or contracting the filament is applied thereto in its lengthwise direction is concentrated toward the outer portion of the filament. As a result, in order to give the filament a strength necessary for withstanding the same exterior force, a total sectional area of the large diameter filament must be larger than that of the thin filament. Hence, it is clear that the use of such a relatively large diameter filament is not economical. As seen from the above reasons, the diameter of the filament should lie within the above mentioned range of 0.1 mm to 1.0 mm.

The relation between the filament diameter $\phi$ and the average diameter D of the helix delineated by one pitch of the helically formed filament will now be described. If the average diameter D is smaller than $2\phi$, it is necessary to make the pitch of the helically formed filament excessively small in order to obtain the necessary elongation. As a result, the filament is frequently broken to an unallowable extent in the same manner as in the case that the filament diameter $\phi$ is excessively small. At the same time, the interior stress produced when forming the helically formed filament becomes excessively large.

On the one hand, each of the helically formed filaments is bundled together without twisting and this reinforcing element is embedded as a cord in the rubberized breaker layer of the tire. The bundle is composed of filaments each of which is helically formed, so that if the filament diameter (D) is larger than $20\phi$, the effective sectional area for maintaining a space between the two adjacent reinforcing elements (a space between the most protruded parts of the two adjacent reinforcing elements) necessary for maintaining the separation resistant property becomes small. That is, it is obliged to reduce the sectional area of the reinforcing element per se and/or reduce the number of the reinforcing elements which constitute the bundle, and as a result, a sufficient cut resistant property could not be obtained.

However, if it is desired to obtain a sufficient cut resistant property, the above mentioned space between the two adjacent reinforcing elements could not be ensured, and as a result, it is possible to obtain the sufficient separation resistant property. In addition, in order to obtain the separation resistant property, not only the space between the two adjacent reinforcing elements in the transverse direction, but also the space between the tread rubber and the reinforcing element as well as the space between the reinforcing element and the carcass in the case of one layer and the space between the two adjacent reinforcing elements in the case of two layers must be maintained within a certain range. In addition, these spaces must be maintained between the most protruded parts of the two adjacent reinforcing elements and hence it is inevitable to use a thick rubber layer, which is considerably uneconomical. As seen from the above, the average diameter D of the helically formed filament is required to lie within the above mentioned range.

The pitch of the helically formed filament is suitably selected in association with the modulus of elasticity of the filament, diameter $\phi$ and average diameter D of the helically formed filament such that the optimum elongation at breaking strength and modulus of elasticity required in dependence with the use of tires are obtained.

The use of only one filament causes the filament diameter to be excessively large for the purpose of obtaining the required cut resistant property, and provides the disadvantages as a consequence of the above mentioned problem and that at the same time the effect of increasing the adhering force necessary for adhering the filament to the rubber becomes small.

The use of more than 50 filaments causes the diameter projected on a plane perpendicular to the axial direction of the reinforcing element to be excessively large even though the diameter D of the helix delineated by one helically formed filament is small and there occurs the same problem that occurred when the average diameter D of the helically formed filament is excessively large.

As seen from the above, the number of helically formed filaments for collectively providing a reinforcing element is suitably selected within the above mentioned range by taking the cut resistant property and the other properties as well as the economy required for the use of tires into consideration.

Adherence of the reinforcing element of the helically formed filament to the rubber will now be described. It is well known that the adherence of the reinforcing element to the rubber must be maintained up to the end of the life of tires. Such maintenance of the adherence can easily be attained without necessitating any technique which is superior to the prior art techniques.

If the reinforcing element is adhered to the rubber by a technique which is the same as that of adhering the conventional standard wire cord to the rubber, the arrangement of a plurality of helically formed filaments bundled together into a reinforcing element is capable of adding physical and mechanical adhering forces to chemical adhering force. As a result, the adherence of the reinforcing element of the helically formed filament to the rubber is far superior to that of the conventional stranded wire cord.

In addition, the modulus of elasticity of the reinforcing element of the helically formed filament is lower than that of the conventional stranded wire cord, so that the difference between the modulus of elasticity of the reinforcing element and that of the surrounding rubber layer becomes considerably small. As a result, the tire according to the invention can significantly improve its separation resistant property if compared with that of the conventional steel cord breaker tire.

The reinforcing element according to the invention has a high tensile strength and a necessary and sufficient elongation at breaking strength. At the same time, both the tensile modulus of elasticity and the compressive modulus of elasticity of the reinforcing element of the helically formed filament are much smaller than those of the conventional steel cord. As a result, the tire according to the invention can obviate all of the disadvantages encountered with the conventional steel cord breaker tires.

As stated hereinbefore, the invention makes use of a tire body comprising a multi-layered carcass of the bias structure composed of rubberized plies containing organic fiber cords. As a result, in the tire according to the invention, particularly the side portions are much resistant to cuts. On the other hand, the use of breaker layers formed of a high cut resistant material, at least one breaker layer being arranged over 40 to 60%, preferably 45 to 55% of the tread width, provides the advantage that the tire exclusive of its hump portion can effectively be reinforced. As a result, a combination of a breaker composed of reinforcing elements having a cut resistant property and a high modulus of elasticity such as metal and a carcass ply composed of organic fiber cord having a relatively low modulus of elasticity ensures an effective suppression of separations not only at the side edges of the reinforcing element layers of the breaker. Also, effective suppression of separation occurs between these cord layers as well as between the reinforcing element layer and the tread rubber without intentionally enhancing the adhering strength of the breaker reinforcing elements to the rubber and the mechanical strengths of the rubber near the reinforcing elements by disregarding the commercial production profit. As a result, the invention is capable of providing a tire having both a superior cut resistant property and a superior separation resistant property.

In addition, in accordance with the invention, if use is made of the reinforcing element composed of a cord formed by stranding filaments, the breaker cords are spaced apart from each other to such a distance that the tread is effectively prevented from being penetrated by stones. Such arrangement of the breaker cords makes it possible to effectively prevent penetration and growth of cuts. Even when the adherence of the breaker cord to the rubber becomes broken or even when the rubber is locally broken, the growth of such breakage are effectively suppressed and hence the separation resistant property of the tire can be improved. As a result, even when the tire is used under severe conditions, the breaker cord arrangement which can prevent growth of the separation plays a role of enhancing the cut resistant property of the tire tread without degrading the necessary separation resistant property.

In accordance with the invention, a provision is made for an organic fiber cord adapted for use as a protecting ply. The protect ply is superimposed about the carcass ply and eventually about the breaker and may be formed by organic fibers such, for example, as nylon, vinylon (polyvinyl alcohol), polyester ply and the like.

The term high cut resistant material shall be understood to include, for example, a metal filament inclusive of a steel filament or a filament formed of an aromatic polyamide fiber having a high modulus of elasticity and the like or a helically formed metallic filament composed, for example, of a helically formed steel filament. Such a high cut resistant material is used as a breaker reinforcing element in the form of a filament per se or a bundle formed by binding together 2 to 50 filaments or a cord of stranded filaments. The stranded cord may be of a conventional cord structure, for example, $7 \times 4 + 1$; $1 \times 3 + 5 \times 7 + 1$; $3 + 6$; $1 \times 5$ and the like.

The invention will now be described in greater detail with reference to the accompanying drawings, wherein:

FIG. 1A is a cross-sectional view of one-half of a tire embodying the present invention;

FIG. 1B is a view of a tire portion showing the angular relationship of reinforcing elements to the carcass cord in the circumferential direction;

FIG. 3 is a graph which illustrates experimental test results of separation resistant property of tires according to the invention compared with those of conventional tires;

Figure 2A:
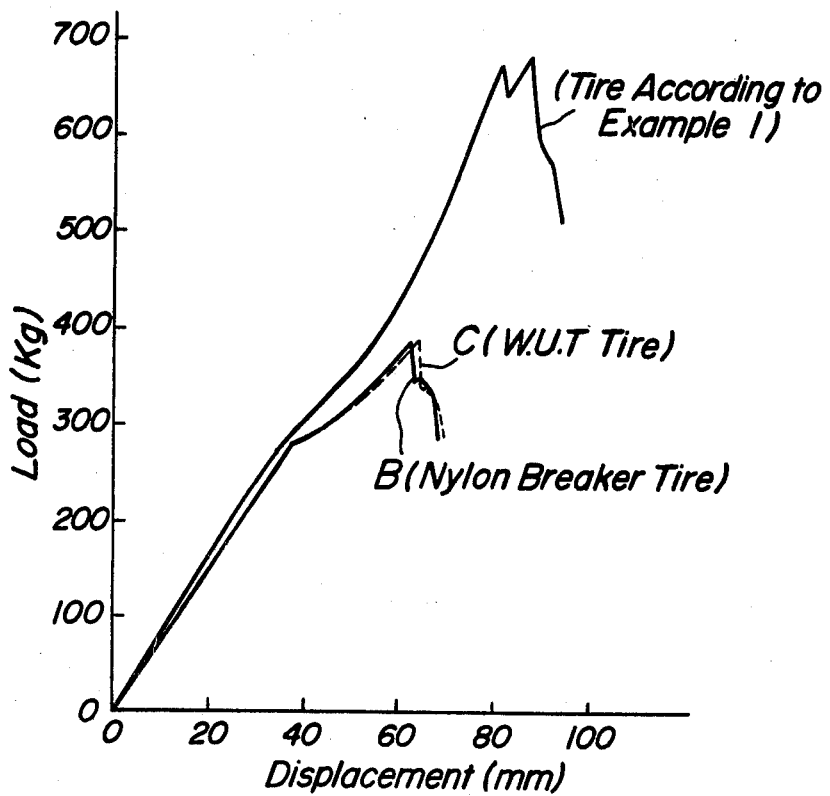
FIG. 2A is a graph which illustrates experimental test results of cut resistant property of a tire according to the invention compared with those of conventional tires.

Pneumatic tires for construction vehicle wheels embodying the invention will now be described with reference to the following Examples.

EXAMPLE 1

In FIG. 1A is shown a radial cross-sectional view of one-half of a tire embodying the invention, the section containing the rotational axis of the tire. The tire shown is of 17.5-25 12 PR in size (12 PR indicates the size on the basis of cotton yarn). In the present example, a bead member 1 is composed of two sets of bead cores 1a, 1b. A carcass ply 2 is composed of 8 plies in total, each ply being composed of nylon cord of 1,260 denier/two strands.

Four plies 2a of the total 8 plies are wound around the bead core 1a from the inside toward the outside thereof and secured to the bead member 1. The other two plies 2b are wound around the bead core 1b from the inside toward the outside thereof and secured to the bead member 1. The remaining two outside plies 2c are extended from the outside toward the inside of the bead cores 1a, 1b along their lower surfaces and are secured at their ends to a toe portion 1c of the bead member 1.

The cords of these carcass plies are inclined at an angle $\alpha$ of approximately 36° with respect to the equatorial line of the tire crown portion. These cords are extended along two opposite directions symmetrically inclined at an angle of approximately 36° with respect to the equatorial line of the tire crown portion. In a crown portion of the tire, about the outside of the carcass plies 2 are superimposed steel wire cord layers 7a, 7b.

The reinforcing element layer 7a is the steel wire cord layer and the layer 7a is extended over a width BWa which is 0.90 of a tread width TW, i.e. $BWa = 0.90$ TW. The steel wire cord layer 7b is extended over a width BWb which is 0.50 of the tread width TW, i.e. $BWb = 0.5$ TW. Each of these steel wire cord layers 7a, 7b is composed of a rubberized fabric containing a plurality of cords each composed of a stranded wire of $1 \times 4 + 6 \times 4 + 1$ (the filament diameter is 0.175 mm and the cord diameter is 1.26 mm). The number of cords per 5 cm is approximately 18, that is, the cords are arranged in an extremely dense manner, $\delta$ being approximately 0.55. These cords are extended along two opposite directions inclined at an angle of approximately 36° with respect to the equatorial line of the tire.

In FIG. 2A is shown an improved cut resistant property of the tire built as above described manner.

Figure 2B:
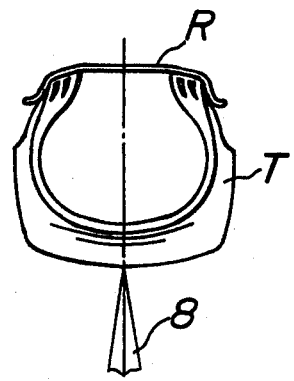
FIG. 2B is a cross-sectional view of the tire from which the test results shown in FIG. 2A are obtained.

In order to obtain the experimental test results shown in FIG. 2A, a tire to be tested T shown in FIG. 2B is united with a standard rim R of 14.00×25 and pressurized to a standard internal pressure of 3.5 Kg/cm². The tire T is mounted on an Amsler's testing machine which makes use of a tapered sharp cutter 8 (FIG. 2B) whose taper angle is approximately 15°, blade width is 60 mm, blade length is 80 mm. The cutter 8 is thrust against the tire to be tested T with a speed of 50 mm/min as shown in FIG. 2B. The cut resistant property of the tire to be tested T was observed with respect to a breaking load in Kg as a function of the amount of penetration of the cutter 8 into the tire T which will be described hereinafter as displacement of the cutter 8.

In FIG. 2A, a curve A shows the test result of the tire according to the present example 1, a curve B shows the test result of a tire comprising two breaker layers each containing 34 stranded nylon cords per 5 cm, the stranded nylon cord being composed of 840 denier/2 strands and the other structure being the same as that of the example 1, and a curve C shows the test result of a WUT tire containing wires each having a diameter of 0.15 mm and a length of 12 mm, a weight ratio of the wires to rubber being 10% and the other structure being the same as that of the tire according to the present example 1.

As seen from FIG. 2A, the breaking load indicating the cut resistant property of the tire according to the invention is two times stronger than those of the nylon breaker tire and WUT tire.

In FIG. 3 is shown as example of experimental tests on load speed per hour as a function of tire running time in hour obtained by an indoor drum testing machine by plotting running time in hour on abscissa and plotting load speed per hour in ton-mile per hour on ordinate. The tire was pressurized to the standard internal pressure of 3.5 Kg/cm². In the present experimental test, the speed was made constant as 11 Km/hr and the load was increased from 60% to 170% in a stepwise manner as shown in FIG. 3. In this case, 100% load corresponds to 6,135 Kg (standard load for 17.5-25 tire as defined by JIS). In FIG. 3, a point A shows a test result of a conventional steel breaker tire, a point B a test result of a nylon breaker tire and a point C a test result of the steel breaker tire according to the example 1 of the present invention.

As shown by the point A, the conventional steel breaker tire exceeded its limit temperature at the third step of the load per hour, thus resulting in the breaker separation. On the contrary, as shown by the point C, the steel cord breaker tire according to the example 1 of the present invention safely passed the third load step and arrived at the fourth load step where the steel cord layer showed separation.

The above experimental tests have yielded for results that the invention is capable of using the steel cord breaker tire which has inherently been susceptible to separation at the point A of 100% load in the same manner as the conventional nylon breaker which occurs separation at the point B of 150% load.

EXAMPLE 2

In the present example, each of the reinforcing element layers 7a, 7b is the steel cord layers and the layers 7a, 7b used in the Example 1 are composed of a rubberized fabric containing stranded wires formed of 1×4+6×4+1 (the filament diameter is 0.175 mm and the cord diameter is 1.26 mm). The number of the cords per 50 mm is made approximately 8, that is, the cords are spaced apart from one another a relatively large distance, δ being approximately 0.80. The breaker angle and carcass are made the same as those of the previous Example 1.

The tire of the present example showed a considerably good separation resistant property while maintaining a satisfactory resistance to cuts.

In FIG. 3, a point D shows the test result of the tire of the present example. As shown from the point D, the tire of the present example causes separation in the steel cord layer at the fifth step of 150% load per hour.

The separation damage occurs in the following order. First, the rubber near the steel cords becomes broken. Under such condition, if the tire continues its running on ground and a considerably long distance has been travelled, the rubber located between the steel cord layers becomes broken and subsequently the breaker separation occurs.

In tires having a conventional steel cord breaker, occurrence of the damage due to separation results in a breakage of rubber near the steel cords and immediately after which the separation is developed to separation of the breaker as a whole.

On the contrary, the use of the measures described according to the invention of increasing the amount of rubber between the two adjacent cords of the steel cord layers or of decreasing the number of cords in a unit length of the rubber ensures a sufficiently long time remained until the breakage of rubber near respective steel cords becomes continuous. As a result, the invention effectively prevents the breakage of rubber near the steel cords from being developed to separation of the breaker as a whole.

EXAMPLE 3

In the present example, each of the reinforcing element layers 7a, 7b is the steel wire cord layers and the layers 7a, 7b are composed of a rubberized fabric containing stranded wires twisted as 1×5 (the filament diameter is 0.25 mm and the cord diameter is 0.68 mm). The number of the cords per 50 mm is 16, that is, the cords are spaced apart from one another a relatively large distance, δ being approximately 0.78 and the other constructional details of the breaker angle and carcass being the same as those of the previous Example 1.

In FIG. 3, the point D also shows the test result of the tire of the present example. As seen from the point D, the tire of the present example showed separation resistant property and resistance to cuts which are the same as those of the previous Example 2.

EXAMPLE 4

In the present example, each of reinforcing element layers 7a, 7b is composed of a rubberized fabric containing helically formed steel filaments each having a diameter ($\phi$) of 0.25 mm., 5 of these helically formed steel filaments are bound together without twisting into a reinforcing element whose diameter (d) is 0.70 mm. The diameter (d) of the filament becomes irregular in dependence with the degree of bundling together the filaments and hence is given by $1.25 \times \sqrt{N} \times$ filament diameter where N is the number of helically formed filaments contained in one reinforcing element. The number of the reinforcing elements per 100 mm is made approximately 32, that is, the reinforcing elements are spaced apart from one another a relatively large distance, δ being approximately 0.78. The other details of the breaker angle and carcass are made the same as those of the previous Examples 2 and 3.

In FIG. 3, a point E shows the test result of the tire of the present example. As seen from the point E, the tire of the present example showed both the separation resistant property and resistance to cuts which are superior to those of the previous Examples 2 and 3.

Figure 4:
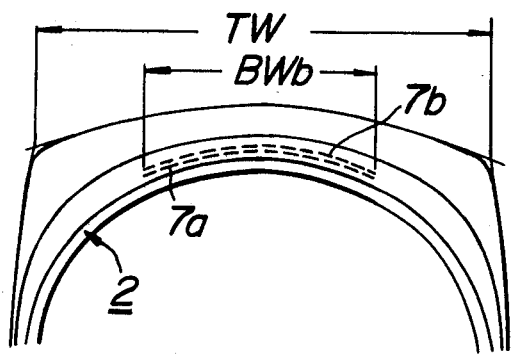
FIGS. 4 to 6 are cross-sectional views of modified forms of a tire embodying the present invention.

In FIG. 4 is shown another embodiment of the tire according to the invention. In the present invention, both the breaker layers 7a, 7b are made equal in width and superimposed one upon the other over a width BWb which is 0.4 to 0.6 of the tread width TW.

Figure 5:
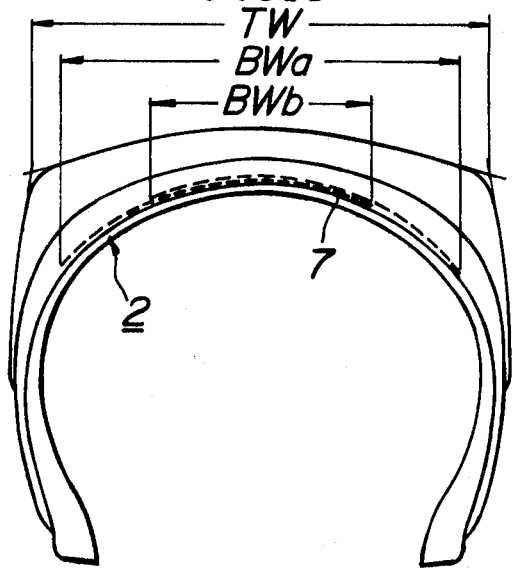

In FIG. 5 is shown a further embodiment of the tire according to the invention. In the present invention, the breaker layers 7a, 7b are partly superimposed one upon the other at their parts adjacent to the peripheral centerline of the tire. The breaker width BWb is also 0.4 to 0.6 of the tread width TW.

Figure 6:
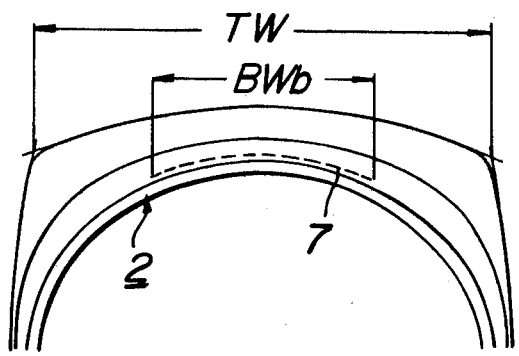

In FIG. 6 is shown a still further embodiment of the tire according to the invention. In the present invention, only one breaker layer is disposed on top of the carcass ply 2. The breaker width BWb is 0.4 to 0.6 of the tread width TW.

Figure 7:
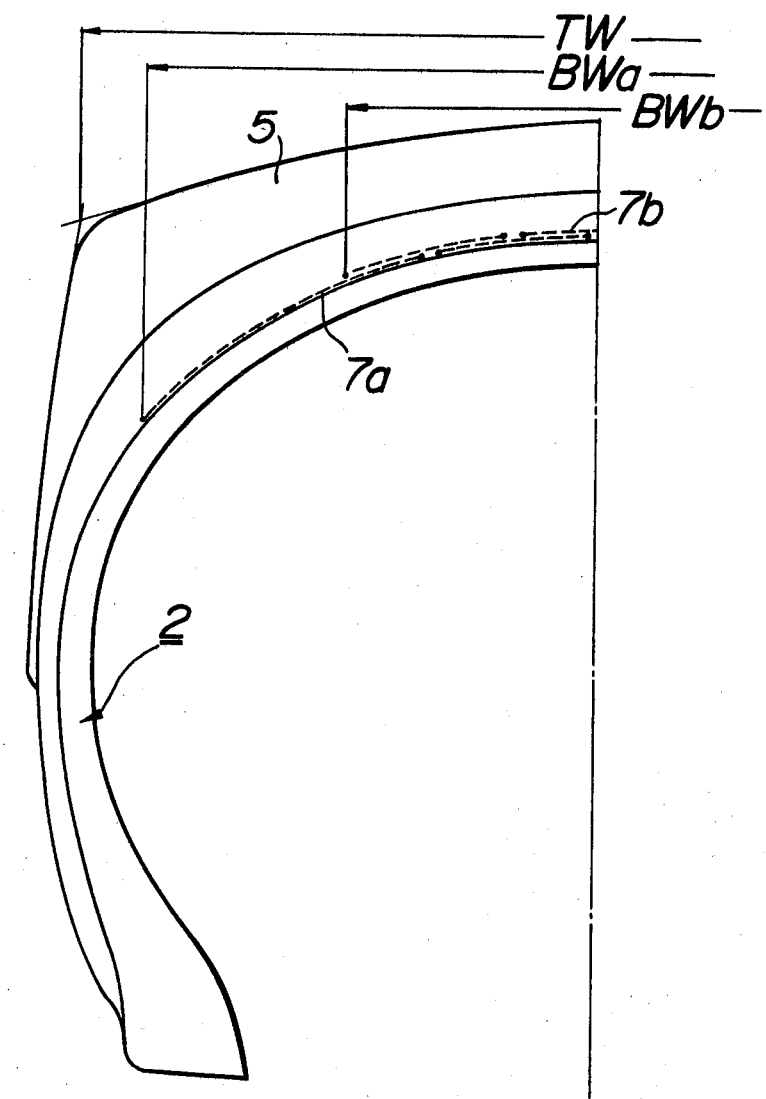
FIGS. 7 to 11 are cross-sectional views of one-half of another modified forms of a tire embodying the present invention.

In FIG. 7 is shown another embodiment of the tire according to the invention. In the present embodiment, the breaker layers 7a, 7b are divided into a plurality of sections in their widthwise direction, respectively, the sections being spaced apart from each other. The width BWb of the narrow layer is made 0.40 to 0.60 of the tread width TW.

In FIGS. 8 to 11 are shown further modified embodiments of the tire according to the invention, in which a protection ply 8, 8a, 8b formed of rubberized layer containing organic fiber is superimposed about the rubberized breaker cord layer 7.

Figure 8:
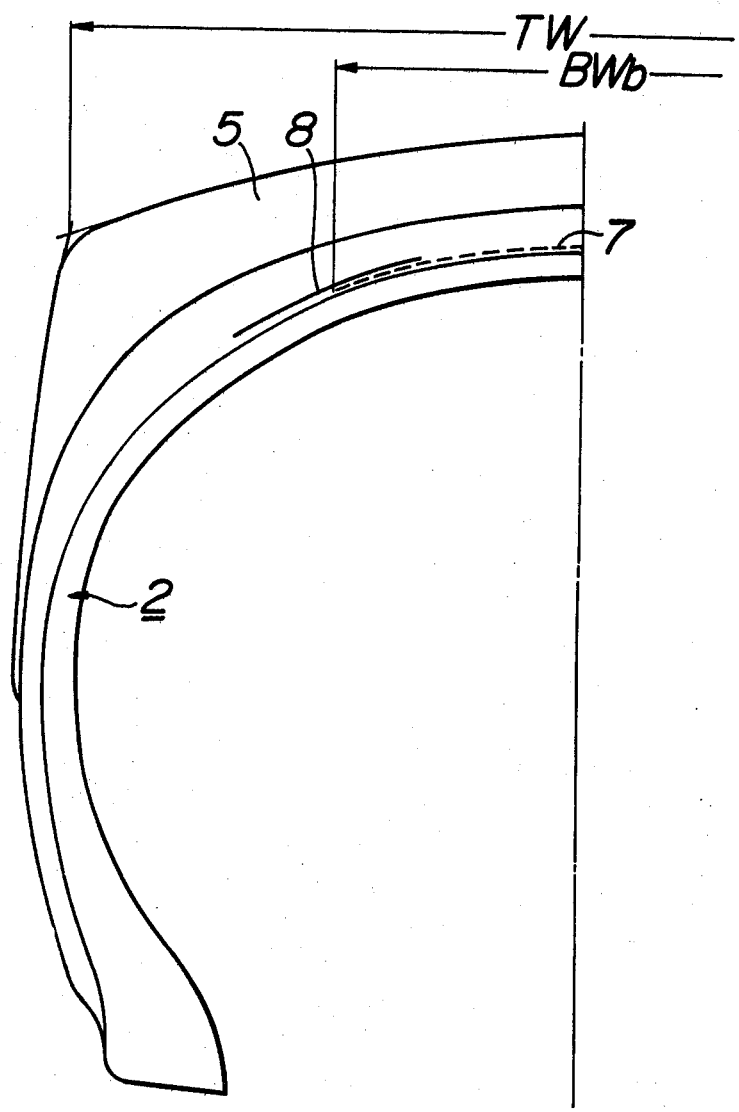

In the embodiment shown in FIG. 8 use is made of a pair of protection plies 8 each of which is superimposed about each side edge of the breaker layer 7.

Figure 9:
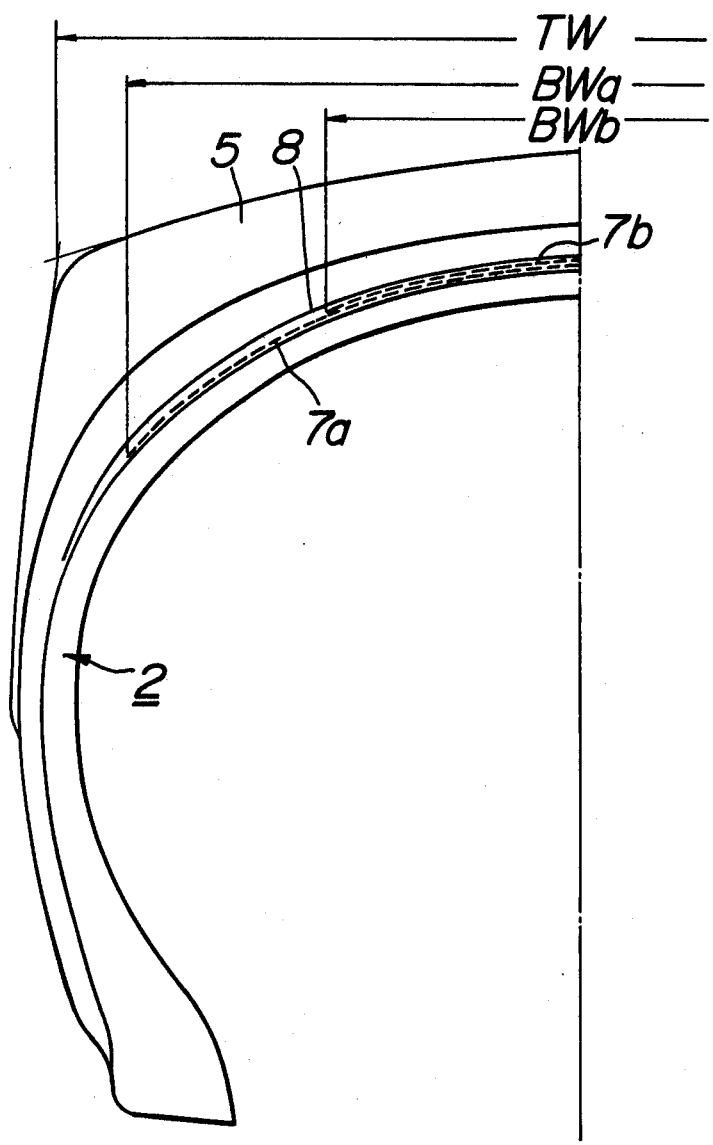

In the embodiment shown in FIG. 9, the protection ply 8 is superimposed about the breaker layers 7a, 7b.

Figure 10:
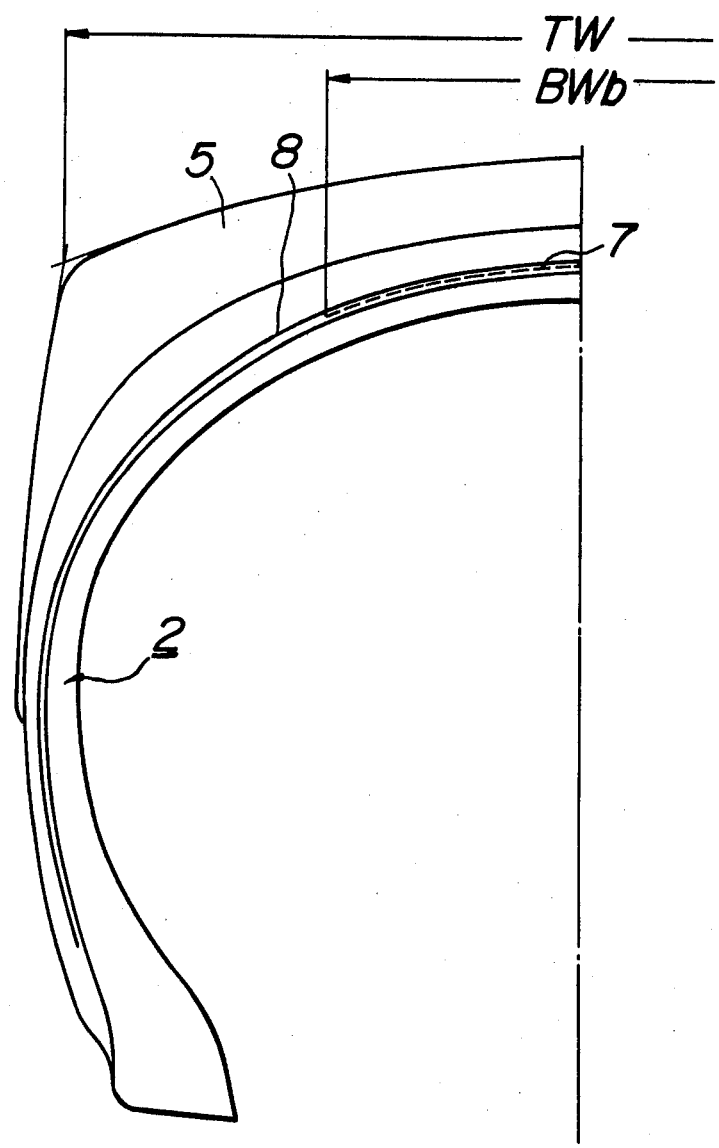

In the embodiment shown in FIG. 10, the protection ply 8 is superimposed about not only the breaker layer 7 but also about the carcass ply 2.

Figure 11:
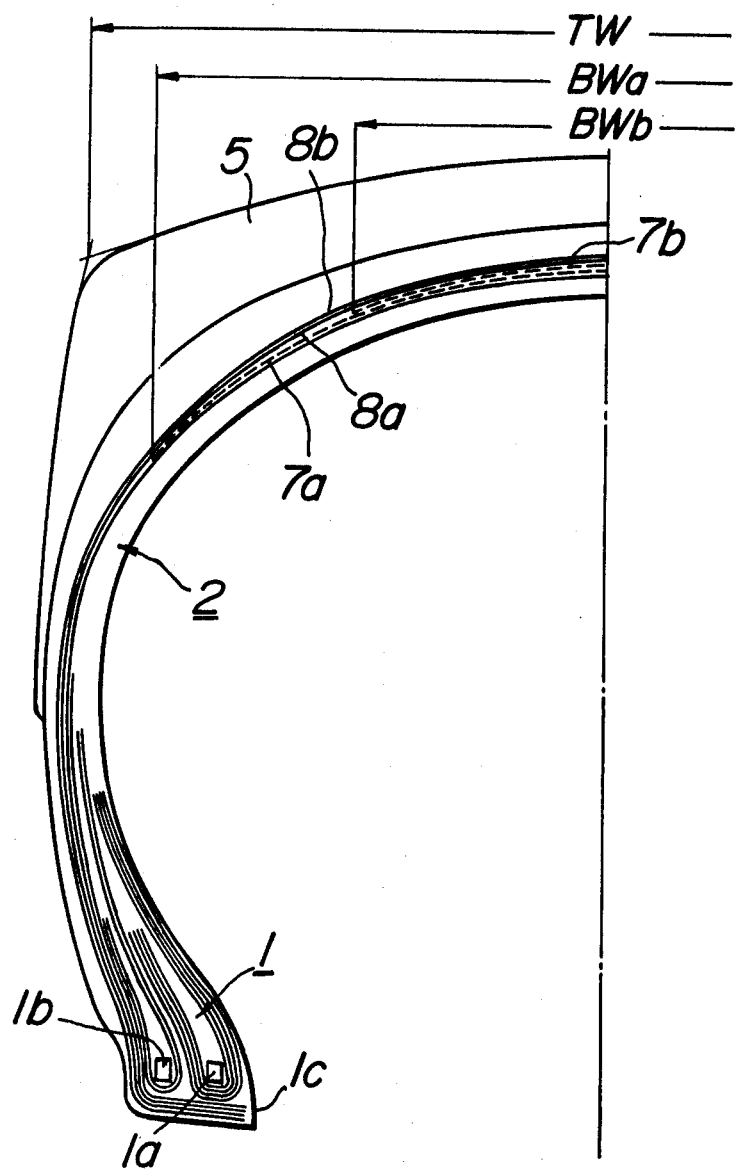

In the embodiment shown in FIG. 11, the protection ply is composed of two plies 8a, 8b and superimposed about not only the breaker layers 7a, 7b, but also the carcass 2 and then is extended from the outside toward the inside along the lower surface of the bead cores 1a, 1b and are secured at their ends to the toe portion 1e of the bead member 1.

In accordance with the invention, the breaker layers may be replaced by one or more than two breaker layers which may be arranged symmetrically and/or unsymmetrically with respect to a center line of a transverse section of the tire.

The cut resistant property and separation resistant property of the tires of the Examples 1, 2, 3 and 4 according to the invention are compared with those of conventional nylon breaker tire and stranded steel cord breaker as shown in the following Table 1, the numerical values shown being based upon a numerical value of 100 for the conventional nylon breaker.

Table 1

|  |  | Cut resistant property (Breaking Load) | (DRUM Durability) Separation resistant property | Cost |  |
|---|---|---|---|---|---|
| Conventional tire | Nylon breaker | 100 | 100 | 100 | |
|  | Steel cord breaker (Stranded wires) | 170 | 65 | 130 | |
| Tire according to the invention | Steel cord breaker (stranded wire) | | | | |
|  | (Example 1) | 170 | 80 | 115 | ← E281 (1×4+6×4+1)×18 cords/50 mm |
|  | (Example 2) | 150 | 94 | 110 | ← E281 (1×4+6×4+1)×8 cords/50 mm |
|  | (Example 3) | 140 | 96 | 110 | ← N155 (1×5)×16/50 mm |
|  | Helically formed filament breaker | | | | |
|  | (Example 4) | 140 | 98 | 103 | ← Helically formed steel filament (5 filaments/bundle)×32 bundles/100 mm |

As stated hereinbefore, the invention is capable of economically designing a tire which can be used on rough ground or a locally rough ground under conditions adapted for such off-road use and hence is useful in practice.

What is claimed is:

1. A pneumatic tire for off-road vehicles, comprising a multi-layered carcass composed of rubberized laminated ply layers, the cords of which are formed of organic fiber and inclined at an angle $\alpha$ selected in the range from 23° to 45° with respect to the equatorial line of the tire, the cords of approximately one-half of said carcass plies extending in an opposite direction to the cords associated with the remaining plies, and a breaker circumferentially superimposed about said multi-layered carcass, said breaker being composed of at least one rubberized layer each containing reinforcing elements, said reinforcing elements comprising a plurality of steel filaments having a tensile strength of at least 140 $Kg/mm^2$, said reinforcing elements inclined at an angle which is not more than 5° larger than a selected angle of said carcass cord and not more than 15° smaller than the selected angle of said carcass cord, and said breaker extending over 40 to 60% of the tread width and having a region located substantially at the center portion of the tread, whereby the tread cut resistance of said region is higher than that of the remaining region of the tread.

2. A pneumatic tire for off-road vehicles as claimed in claim 1, wherein each of said breaker reinforcing elements is composed of a cord formed of steel stranded wires and a ratio $\delta$ of the space formed between the two adjacent cords in each layer to the pitch between the midlines of two adjacent cords in each layer is given by $$\delta = (S - d)/S = 0.67 \text{ to } 0.83$$

where S is the pitch in mm between the midlines of two adjacent cords in each layer and d is a cord diameter.

3. A pneumatic tire for off-road vehicles as claimed in claim 1, wherein said plurality of steel filaments is formed into a bundle comprising helically formed filaments numbering in the range of 2 to 20 for each bundle.

4. A pneumatic tire for off-road vehicles as claimed in claim 1, wherein each of said breaker reinforcing elements is a cord of filaments.

* * * * *